Patented Aug. 31, 1943

2,327,996

UNITED STATES PATENT OFFICE 2,327,996

PROCESS OF DEHYDRATING MINERAL OIL EMULSIONS

Thompson W. Burnam, Inglewood, Calif.

No Drawing. Application November 24, 1941, Serial No. 420,267

3 Claims. (Cl. 252—331)

This invention relates to a process for dehydrating mineral oil emulsions and for simultaneously cleaning or purifying the oil phase of the emulsion.

The process of the present invention is intended for treating natural emulsions of petroleum containing petroleum and brine. The invention is predicated upon the discovery of the effective properties of thermoplastic materials in separating from petroleum oil emulsions the water content of the emulsions while simultaneously removing other impurities from the emulsion. I have discovered that certain thermoplastic materials of the type heretofore employed in the coating or plastic resin industry may with advantage be employed for the purpose of treating natural petroleum emulsions.

The material employed in the treatment contains as a base a cellulose ether, such as ethocel, or products resulting from the interaction of ethyl chloride with an alkali cellulose. For the purposes of the present invention the cellulose ether is usually dissolved in a suitable solvent, such as a high aromatic content petroleum solvent, or perhaps solvents or coal tar hydrocarbons or alcohols. In order to develop fully the properties intended, the thermoplastic material employed usually also includes plasticizing agents, such as the plasticizers of the urea formaldehyde or urea melamine formaldehyde type, and may also include plasticizers of the alkyd resin type.

I have found that when solutions of thermoplastic materials are commingled with a natural emulsion of petroleum and brine that they form a layer of rubbery gelatinous-like consistency, which layer upon settling of the contents floats upon the brine separated from the petroleum and separates the brine from the petroleum. This rubbery or gelatinous layer has the unusual property of absorbing or otherwise extracting water from a natural emulsion of petroleum and brine. It is enabled to quickly break or separate any such emulsion. In many cases, a petroleum emulsion may be entirely dehydrated merely by passing the petroleum emulsion through such a layer of the thermoplastic material. Thus, for example, one method of dehydrating petroleum emulsions in accordance with the principles of the present invention is to add sufficient of the thermoplastic composition to a tank of oil to form a layer or film across the residual brine at the bottom of a tank into which the petroleum emulsion is to be run. The petroleum emulsion is then introduced into the tank below the layer of thermoplastic material. The layer of thermoplastic material is at first elevated in the tank upon the introduction of the petroleum emulsion but will rapidly settle down to the brine level, the petroleum of the emulsion moving to above the thermoplastic material. As the layer of thermoplastic settles, it absorbs the brine from the petroleum emulsion leaving above the layer only dehydrated petroleum, and sharply separates the brine from the oil which has been completely dehydrated by the operations.

In other cases, agitation of the thermoplastic types of materials with the natural oil emulsions may be employed for dehydrating such emulsions, in which case after the completion of such dehydration operations the thermoplastic material quickly separates from the oil and forms a layer of gelatinous or rubber-like consistency floating upon the brine at the bottom of the container, and sharply separates the clearly dehydrated petroleum from its original brine content.

The treatment of the petroleum oil emulsions by the thermoplastic materials in accordance with the present invention effects a number of additional actions on the oil. Thus, any impurities, foreign matter, solids, or tars are removed from the oil. To a substantial extent the treatment also has the effect of de-waxing the oil. The treatment has also been found to remove or reduce to a marked extent the sulphur content of the oil. Thus, the process of the present invention consists not only in a dehydration treatment for petroleum oil emulsions, but acts also to clean and purify the oil content of the emulsion.

As a particular example of the process embodying the present invention, I have employed as a dehydrating agent a composition of thermoplastic material, consisting of 16 ounces of ethocel or a cellulose ether resulting from the interaction of ethyl chloride with alkali cellulose being dissolved in 1 gallon of a suitable solvent, such as a high aromatic content petroleum solvent. To prevent the resulting layer of material which forms when this material is floated upon water setting to too solid a consistency, I have also added to such composition 2 ounces of plasticizing material, such as the urea formaldehyde or melamine formaldehyde resin type of plasticizers. I also find that it is desirable to add 2 ounces of the alkyd resin type of plasticizers.

When it is desired to dehydrate a natural emulsion of petroleum and brine by the use of such a composition, I employ about 10 gallons of such a composition for each 100 barrels of emulsion to be dehydrated. The composition may be agitated with the emulsion and the admixed contents then merely allowed to settle, or the composition may be floated upon a small quantity of brine at the bottom of a tank into which the emulsion is to be introduced. Thereafter, the emulsion is introduced underneath the layer of the composition, and in many cases will be completely dehydrated in passing through the rubbery or gelatinous layer of the composition.

While the particular process herein described is well adapted to carry out the objects of the present invention, it is to be understood that various changes may be made in the composition of the thermoplastic material employed in the dehydrating operations or in the specific manner of mechanically mixing or contacting said composition with the emulsion to be dehydrated, and the present invention includes all such variations and changes as come within the scope of the appended claims.

I claim:

1. A process of treating natural emulsions of petroleum containing petroleum and brine, which consists in contacting the natural emulsions with a cellulose ether thermoplastic material capable of dehydrating the emulsion, and producing a gelatinous layer separating the brine and petroleum of the emulsion.

2. A process for treating natural emulsions of petroleum brine, which consists in contacting the emulsion with a thermoplastic material containing an ethyl cellulose, a plasticizing agent, and a solvent therefor so as to separate the brine from the petroleum of said emulsion, and producing a gelatinous layer of such thermoplastic material between the brine and petroleum of said emulsion.

3. A process of treating natural emulsions of petroleum and brine, which process consists in forming a layer of a thermoplastic substance including a solution of ethyl cellulose, floating said layer upon brine, and introducing the natural emulsion to be dehydrated below said layer so as to cause said emulsion to penetrate through said layer.

THOMPSON W. BURNAM.